United States Patent Office 3,297,690
Patented Jan. 10, 1967

3,297,690
SUBSTITUTED TRIAZINE SALT
Hugh T. Harrison, Tulsa, Okla., assignor to The Dow Chemical Company, Midland, Mich., a corporation of Delaware
No Drawing. Filed Nov. 2, 1964, Ser. No. 408,337
3 Claims. (Cl. 260—242)

The present invention is directed to organic chemistry and is directed, in particular, to a substituted triazine salt which is a monosalt of, on the one hand, 2,4-diamino-6-phenyl-s-triazine, and, on the other hand, a member selected from the group consisting of hexafluoroarsenic acid and hexafluorophosphoric acid. The compounds of the present invention are crystalline solid materials; they are useful for the control of "rough" fish. They are also useful when employed as agents to inhibit the corrosion of metal by aqueous hydrochloric acid solutions.

In the present specification and claims, the term 2,4-diamino-6-phenyl-s-triazine is employed in the customary sense to designate a compound being of the formula

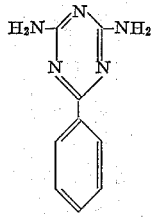

The product compounds of the present invention are prepared by reacting 2,4-diamino-6-phenyl-s-triazine with hexafluoroarsenic or hexafluorophosphoric acid. Conveniently, the reaction is carried out in an inert liquid reaction medium, such as water or a lower alkanol. The reaction is exothermic and takes place smoothly at temperatures of from $-10°$ to $80°$ C. Good results are obtained when substantially equimolecular amounts of the reactants are employed, or when the acid reactant is employed in an amount which is in excess of the equimolecular amount.

The hexafluoroarsenic or hexafluorophosphoric acid reactant is usually supplied to the reaction mixture as a liquid. Conveniently, the liquid employed is the commercial product which contains 65 percent $HAsF_6$, 21 percent $H_2O$, and 14 percent related arsenic acids, or the commercial product which contains 65 percent $HPF_6$, 21 percent $H_2O$, and 14 percent related phosphorus acids. In other procedures, a liquid containing one of the acids is prepared in the manner of Nuttall et al. in their preparation of an aqueous solution of hexafluorophosphoric acid. See Journal of the Chemical Society (London) 1960, pages 4965–4970. In yet other procedures, it is sometimes convenient to supply the hexafluoroarsenic or hexafluorophosphoric acid reactant to the reaction as a hydrate.

In carrying out the reaction, 2,4-diamino-6-phenyl-s-triazine is contacted with the acid in any conventional manner, conveniently by adding one reactant to the other reactant. The temperature of the resulting reaction mixture can be controlled by regulating the rate of the contacting of the reactants as well as by external cooling. Upon completion of the contacting of the reactants, most of the reaction will have taken place with production of the desired salt product as a precipitate in the reaction mixture. Where optimum yields are desired, it is often convenient that the reaction mixture be allowed to stand for a period of time. Upon completion of the reaction, the desired product can be separated from the reaction mixture by filtration or by removal of the inert liquid reaction medium. The removal of the reaction medium is conveniently accomplished by evaporation or distillation under subatmospheric pressure. The separated salt product can be employed for the useful purposes of the present invention or can be purified by conventional procedures such as washing with water or suitable organic liquid or recrystallization, to prepare a purified product which can also be employed for the useful purposes of the present invention.

The following examples set forth the best mode of the present invention now known by the inventor and will enable those skilled in the art to practice the present invention.

EXAMPLE 1

2,4-diamino-6-phenyl-s-triazine hexafluoroarsenate 2,4-diamino-6-phenyl-s-triazine (40 grams; 0.21 mole) was mixed with 100 grams of a 65 percent solution of $HAsF_6$ (0.34 mole of $HAsF_6$) and 100 milliliters of methanol. The resulting mixture was heated to a temperature of $150°$ F. and maintained at this temperature for a period of about 30 minutes. Thereafter, the mixture was permitted to return to room temperature and maintained overnight at room temperature, during which substantially all of the methanol evaporated, leaving a solid 2,4-diamino-6-phenyl-s-triazine hexafluoroarsenate product as a residue. The product residue was washed with several portions of diethyl ether and the washed product dried, initially, by being placed on a filter which was subjected to subatmospheric pressure, and, subsequently, by being placed in a container with a desiccating agent and being subjected to subatmospheric pressure. The product melts at 208–213° C.

In a similar manner, 2,4-diamino-6-phenyl-s-triazine hexafluorophosphate product melting at 212° C. was prepared from 2,4-diamino-6-phenyl-s-triazine and hexafluorophosphoric acid.

When a product of the present invention is employed for the useful purposes of the present invention, the unmodified product can be utilized. However, the present invention also encompasses the utilization of the product together with an adjuvant. In such utilization, the product can be dispersed upon a finely divided solid and the resulting preparation employed as a dust. Also, a product of the present invention, or a composition comprising a product of the present invention and a finely divided solid, can be dispersed in water with the aid of a wetting agent and the resulting aqueous suspension employed as a spray. In other procedures, a product according to the present invention can be employed as the constituent of organic liquid compositions, oil-in-water, or water-in-oil emulsions, or water dispersions, with or without the addition of wetting, dispersing, or emulsifying agents.

In representative operations, there was prepared a treated body of water containing, dispersed throughout, one part of 2,4-diamino-6-phenyl-s-triazine hexafluoroarsenate per million parts by weight of the treated body of water. Thereafter, a known number of lake emerald shiner fish was introduced into the treated body of water. Twenty-four hours after the introduction of the fish, the treated body of water was examined to determine the percent kill and control of the fish introduced into the body of water. It was found that a 100 percent kill and control of the introduced fish was obtained.

In other representative operations, a corrosion coupon of a steel designated as A.P.I. N–80 was placed in a solution comprising 15 percent HCl and 0.1 percent of the polyglycol prepared by condensing 1 mole of di-sec-butylphenol per 15 moles of ethylene oxide to serve as a comparative test solution. Another solution containing a corrosion coupon was prepared in identical procedures except that 1.0 percent of 2,4-diamino-6-phenyl-s-triazine hexafluorophosphate was added during the preparation. Both solutions were maintained at 150° F.

for 16 hours. At the end of the 16 hours, each metal coupon was weighed to determine weight loss due to corrosion by the HCl, and the results were thereafter converted into pounds lost by corrosion per square foot per 24-hour day. As a result of these operations, it was found that the corrosion rates were as follows:

|  | Corrosion rate (pounds/square foot/24 hour day) |
|---|---|
| Comparative test | 0.61 |
| Solution containing 1.0 percent of 2,4-diamino-6-phenyl-s-triazine hexafluorophosphate | 0.36 |

Similar results are obtained when employing 2,4-diamino-6-phenyl-s-triazine hexafluoroarsenate in the inhibition of metal corrosion by HCl.

I claim:
1. Monosalt of 2,4-diamino-6-phenyl-s-triazine and a number selected from the group consisting of hexafluoroarsenic acid and hexafluorophosphoric acid.
2. 2,4-diamino-6-phenyl-s-triazine hexafluoroarsenate.
3. 2,4-diamino-6-phenyl-s-triazine hexafluorophosphate.

References Cited by the Examiner

UNITED STATES PATENTS 2,527,314   10/1950   Mackey _____ 260—249.9

WALTER A. MODANCE, *Primary Examiner.*

JOHN M. FORD, *Assistant Examiner.*